United States Patent [19]

Stringer

[11] Patent Number: 4,543,901
[45] Date of Patent: Oct. 1, 1985

[54] SURFACE EFFECT SHIP AIR CUSHION SEAL SYSTEM

[75] Inventor: Robert A. Stringer, Slidell, La.
[73] Assignee: Textron, Inc., Providence, R.I.
[21] Appl. No.: 703,032
[22] Filed: Feb. 19, 1985

Related U.S. Application Data

[63] Continuation of Ser. No. 548,913, Nov. 7, 1983, abandoned.

[51] Int. Cl.$^4$ ................................................ B63B 1/38
[52] U.S. Cl. .................................. 114/67 A; 180/126
[58] Field of Search ............. 114/67 A; 180/124, 126, 180/128; 150/48, 50

[56] References Cited

U.S. PATENT DOCUMENTS

| | | | |
|---|---|---|---|
| 1,225,511 | 5/1917 | Sexton | 150/48 |
| 1,439,180 | 12/1922 | Magovern | 150/48 |
| 4,090,459 | 5/1978 | Chaplin | 114/67 A |

FOREIGN PATENT DOCUMENTS

| | | | |
|---|---|---|---|
| 275333 | 4/1965 | Australia | 114/67 A |
| 1552364 | 9/1979 | United Kingdom | 180/128 |

*Primary Examiner*—Sherman D. Basinger
*Attorney, Agent, or Firm*—Bean, Kauffman & Bean

[57] ABSTRACT

There is disclosed an improved air cushion seal system of the inflatable lobe type such as for operating between the sidehulls of a surface effect ship (SES), wherein in accordance with the invention at least the lowermost lobe of the system is partially closed at each of its opposite ends by a fabric sheet which is inset from the ship sidehulls. These substantially impervious to air passage sheets are affixed to the side edges of the lower loop of the lobe and up and around its aft end, and optionally to the upper loop of the lobe, to minimize scooping and water filling of the lobe, and to operationally stabilize the lobe.

6 Claims, 6 Drawing Figures

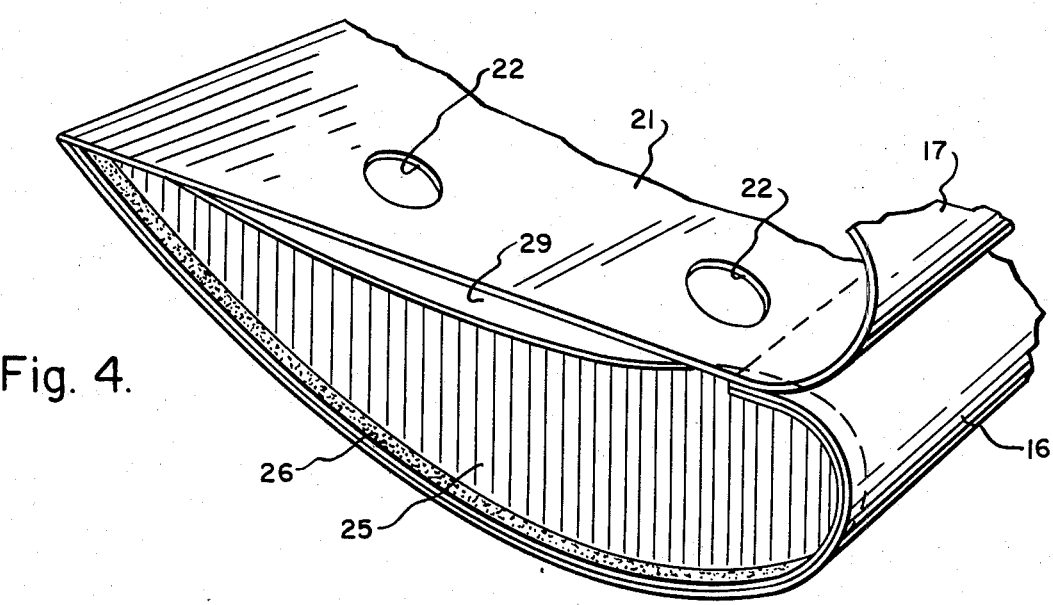
Fig. 4.
Fig. 5.
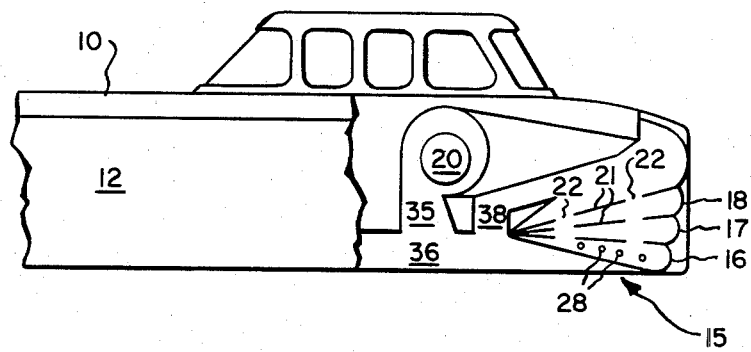
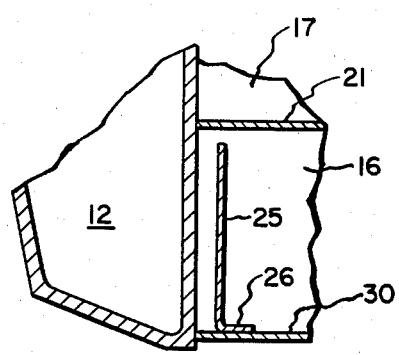
Fig. 6.

SURFACE EFFECT SHIP AIR CUSHION SEAL SYSTEM

This is a continuation of application Ser. No. 548,913, filed Nov. 7, 1983, and now abandoned.

BACKGROUND AND OBJECTS OF THE INVENTION

This invention relates to air cushion supported vehicles, and more particularly to marine vessels such as are referred to as surface effect ships ("SES"). Specifically, the invention relates to improvements in flexible air cushion seal systems such as for the stern ends of such vessels of the type which comprise one or more inflatable "lobes" provided to extend between the sidehulls or skegs of the ship as shown for example in U.S. Pat. Nos. 3,977,491; 4,090,459, and now pending co-assigned U.S. patent application Ser. No. 434,590, filed Oct. 15, 1982. Also, such seal systems may be employed as partitioning keels or skegs in such craft for improved operational stability purposes; such as is shown for example at 28 in U.S. Pat. No. 3,524,517.

Such seal devices are hingedly affixed to the hull structure so as to bridge the water/air cushion space beneath the ship, while being adapted to vertically float between the sidehulls of the ship in conformity with operational variances in the height of the air cushion under the ship so as to maintain the air cushion support under the vessel. As such seal systems flex vertically, the opposite ends of the lobes slide and rub against the adjacent stationary structures of the vehicle; and due to sidehull plating irregularities, variable sidehull geometries, and sea state encountered side loads thereon during operation of the vessel, such rubbing action between the sidehulls and the seal lobe components has heretofore resulted in early loss of efficient performance and serious maintenance cost problems.

In surface effect ships having air cushion seals of this type, it is the lowermost air cushion sealing lobe of the system that is most subject to a large variety of wave-buffeting/distortioning and frictional wearing stresses; and it is the purpose of this invention to provide for such a seal system an improved lower lobe construction which substantially reduces installation and maintenance expenses relative to the frictional wear effects on the lobe parts. The invention also minimizes water scooping problems while at the same time providing an operationally stabilized lobe construction which in consequence provides an improved overall air cushion sealing capability.

BRIEF SUMMARY OF THE INVENTION

According to the invention, the seal system thereof comprises in combination with the sidehulls of an SES or the like, one or more "pillow" type inflatable lobes which are primarily constructed of air impervious flexible sheet material. The lowermost lobe of the system is partially closed at its opposite ends by fabric sheets which are positionally inset from the ship sidehulls. These sheets are affixed to the lower loop and aft end of the lower lobe (and optionally to the upper loop or diaphragm of the adjacent lobe) to minimize scooping and water filling of the lobe and also to operationally stabilize the lobe. By virtue of this invention, cushion seal efficiencies are advanced and maintenance costs are substantially reduced.

BRIEF DESCRIPTION OF THE DRAWINGS

FIG. 4 is a fragmentary view corresponding to a portion of FIG. 2, illustrating a modified form of lobe construction of the present invention;

FIG. 5 corresponds to FIG. 1, but illustrates another arrangement for inflation of the stern seal; and FIG. 6 is a fragmentary sectional view corresponding to FIG. 3, but illustrates how the flange portions of the end cap sheets may be inwardly disposed.

DETAILED SPECIFICATION

Figure 1:
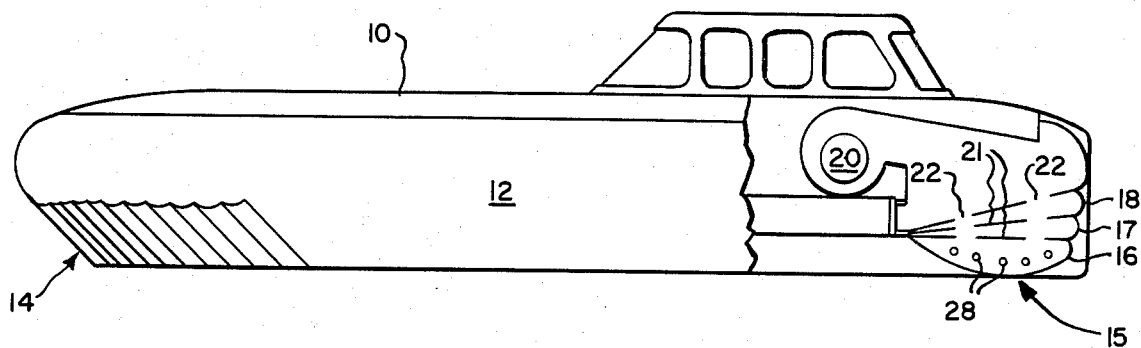
FIG. 1 is a side elevational view of a surface effect ship of typical construction, partially broken away to show incorporated therein a stern seal system of the present invention and one arrangement for inflation thereof.

As illustrated at FIG. 1, the invention may be employed in a generally conventional type surface effect ship such as comprises a main structure or platform 10 which is buoyantly supported relative to a body of water by means of opposite sidehulls 12. To enable the ship to operationally ride substantially higher upon a cushion of air, the sidehulls are encompassed at the bow end of the ship by means of any suitable bow seal system such as is designated 14, and at the stern end of the ship in the case of the present invention by means of a seal device as is shown generally at 15 extending laterally between the stern ends of the sidehulls 12. However, it is to be understood that the invention may be embodied in a bow seal for such vessels, and substituted for intermediately disposed seal systems for purposes such as shown for example in U.S. Pat. No. 3,524,517.

Figure 2:
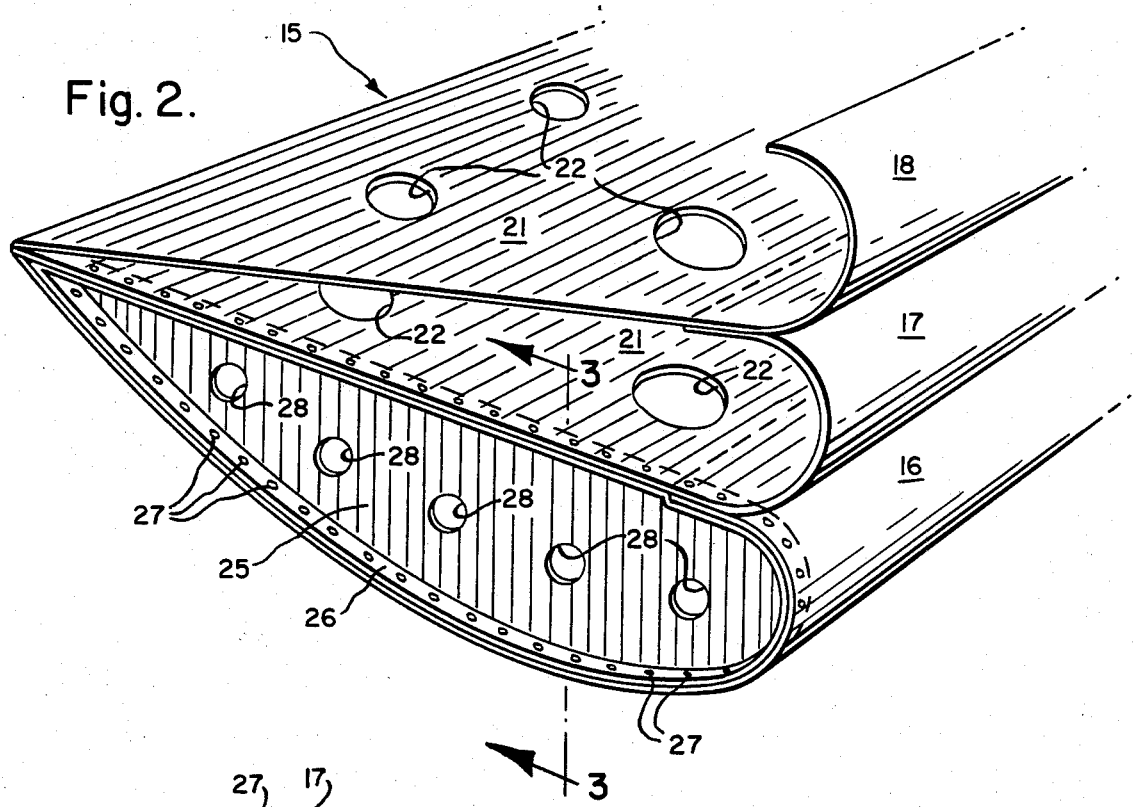
FIG. 2 is a fragmentary perspective end view, on enlarged scale, showing details of construction of the stern seal lobes of FIG. 1.

Thus, as explained in the above referenced patents, the space beneath the ship platform 10 is adapted to confine a cushion of air for partially raising the ship out of water whenever a suitable supply of compressed air is furnished thereto as by means of a blower(s) as is well known in the art. By way of example, the invention is illustrated at FIGS. 1 and 2 and further described in detail herein as being embodied in a stern seal comprising three such lobes designated 16,17,18 respectively, but it is to be understood that any number of such lobes may be employed. The seal lobes are arranged to be inflated, such as from a compressed air supply means as shown at 20 (FIG. 1); the diaphragm portions 21 of the lobes being apertured as shown at 22 to intercommunicate them pneumatically. Also, the lowermost lobe 16 is preferably provided with water drain holes (not shown) as is well known in the art.

The seal lobes are fabricated of sheets of high tensile strength flexible air impervious material, such as for example a typically employed elastomeric coated woven nylon fabric or the like; and as shown the lower loop of fabric of each lobe is rolled upwardly and then forwardly at its aft end and then lapped under and bonded to the lower loop of fabric of the next above lobe. Thus, upon operation of the pressurized air supply means 20 the entire seal assembly will be inflated to provide a "stack" of lobes as shown by way of example at FIG. 1 to seal the stern end of the ship against undue escape of pressurized air from the "air cushion" chamber under the ship platform 10.

Figure 3:
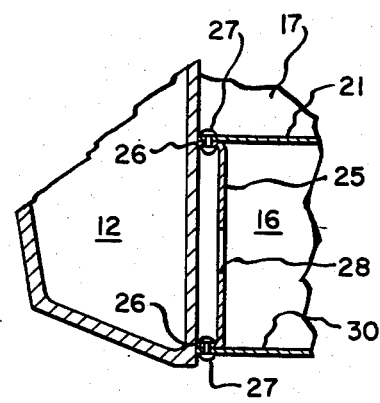
FIG. 3 is a fragmentary sectional view taken as along line 3—3 of FIG. 2.

In accordance with one preferred form of the present invention, the lowermost lobe of the seal system as depicted at 16 and as illustrated at FIGS. 2 and 3, is partially closed at each of its opposite ends by means of a fabric sheet such as is designated 25 which is marginally right-angle folded either inwardly or outwardly as shown at 26 (FIGS. 3, 4 and 6) and peripherally affixed to the fabric of the lobe 16 such as by means of nut-bolt-/rivet type devices 27. Or, in lieu thereof the edge portions 26 of the sheet 25 may be adhesively, thermoplastically or otherwise bonded to the fabric of the lobe, but in any case is inset relative to the extreme ends of the lobes to avoid frictional contacts with the ship sidehulls. Thus, the lowermost lobe 16 of the seal system is structurally stabilized at its opposite ends against water wave buffeting forces or the like, and any desired degree of such stabilizing performance may be provided by employing sheet material of engineering dictated stiffness characteristics.

As explained hereinabove, all the lobes of the seal system may be inflated by the device 20 via the apertures 22 through the diaphragms 21 of the lobes; and in this case the end closure sheets 25 of the lowermost lobe 16 are preferably apertured as shown at 28 in order to permit air to bleed through the opposite ends of the lobe. Thus, air pressures at opposite sides of the closure sheets are substantially balanced, whereby frictional rubbing of the closure sheets against the ship sidehulls is substantially avoided. It is also a particular feature of the present invention that the closure sheets 25 at opposite ends of the lowermost lobe provide barriers operating to prevent scooping of any substantial amounts of water into the lobe incidental to operational buffetings of the lobe.

FIG. 4 corresponds to the lower portion of FIG. 2, but illustrates a modified form of the invention, wherein the lowermost lobe end closure sheet 25 is inset relative to the ends of the lobe and affixed to the lobe 16 only around the lower or bottom loop portion thereof. As previously explained, this may be performed by either riveting/bolting or bonding processes, or the like. Thus, the upper edge of each closure sheet 25 is left free from the diaphragm or lower loop portion 21 of the next above lobe 17, whereby these portions of the assembly are free to separate and provide an air "breathing space" 29 therebetween (FIG. 4) which is effective both to smooth out sea-state operation of the seal system and is also beneficial to the structural integrity/life characteristics thereof. In this case the sheets 25 are also constructed of material to be selected so as to provide the desired degree of operational stability for the lobe 16, but will not require provision of air flow apertures therethrough such as shown at 28 in FIGS. 2 and 3. Water drainage openings will of course be provided through the bottom loop of the lowermost lobe, as illustrated at 30 (FIG. 3), as is well known in the art.

Thus, here again, the construction of FIG. 4 provides a seal system wherein the lowermost lobe is substantially fortified at its opposite ends against water scooping problems, and is operationally-beneficially stabilized by the end closure sheets 25. Whereas these beneficial closure sheets 25 are positionally displaced relative to the sidehulls of the ship, operational wear and tear thereon is substantially avoided by the pressure balanced configuration. Such wear and tear that does take place may be economically repaired or replaced without necessitating removal of the entire lobe structure from the vessel. There is thus provided an improved lobe construction whereby optimum life expectancy of the initially installed seal system is substantially extended; and necessary repairs/replacements of parts thereof may be effected at minimum cost.

FIG. 5 corresponds to FIG. 1, but illustrates another system for inflating the stern seal assembly 15 which again is shown as comprising a stack of three lobes 16,17,18. Although it is to be understood that the seal assembly may comprise any other preferred number of lobes as explained in connection with FIGS. 1-4. In the case of FIG. 5, the compressed air supply means 20 is arranged to draw ambient air in laterally and discharge through a duct 35 directly into the air cushion chamber 36 of the ship; and a bypass duct 38 is provided to feed air from the cushion 36 into the uppermost lobe 18 and thence through the apertures 22 into the lower lobes. In this case, the lobe feed pressure will be substantially equal to the cushion pressure; a condition such as may be preferred in certain class surface effect ships. FIG. 6 illustrates how the marginal edge portion of the closure sheet 25 may be right-angle bent inwardly (as distinguished from outwardly, as shown in FIGS. 2, 4 and 4) and slightly inset relative to the extreme ends of the lobe to avoid frictional contact with the ship sidehulls. Inasmuch as the closure sheets provide for limited air flow therethrough, the pressures at opposite sides thereof are automatically substantially balanced, whereby frictional contacts between the closure sheets and the ship sidehulls are substantially avoided. Thus, it is to be understood that the lowermost lobes of seal systems of the invention may be constructed either in accordance with FIGS. 2, 3, 4 or 6 of the drawing herewith, whereby the afore-described advantages of the invention may be realized.

What is claimed is:

1. In combination, a surface effect ship of the type having relatively spaced rigid sidehull structures with generally parallel inboard sides thereof extending beneath the main body of the ship into and below the water line of the ship to partially define an air cushion space beneath said ship, and an air cushion seal system comprising a stack of inflatable lobes fixed to said ship so as to extend between and have opposite ends cooperating with said inboard sides to assist in sealing said air cushion space;

said inflatable lobes being primarily formed of sheets of flexible air passage-impervious material, wherein a lower most of said lobes includes a lower loop portion having its aft end rolled upwardly and forwardly for attachment to a lower loop portion of a next above lobe;

partial closure sheets formed of flexible and substantially air passage-impervious material having marginal edges right-angle folded and attached to said opposite ends of said lowermost of said lobes only around said lower loop portion while being free from attachment to said lower loop portion of said next above lobe so as to partially close said opposite ends of said lowermost of said lobes against water ingress while providing a degree of configuration stabilization to said opposite ends of said lowermost of said lobes against operationally encountered buffeting forces; and said closure sheets are inset relative to said opposite ends of said lowermost of said lobes so as to avoid frictional contacts thereof with said inboard sides.

2. The combination as set forth in claim 1 wherein said closure sheets have their right-angle folded marginal edges bent outwardly and affixed thereat to said lower loop portion of said lowermost of said lobes.

3. The combination as set forth in claim 1 wherein said closure sheets have their right-angle folded marginal edges bent inwardly and affixed thereat to said lower loop portion of said lowermost of said lobes.

4. In combination, a surface effect ship of the type having relatively spaced rigid sidehull structures with generally parallel inboard sides thereof extending beneath the main body of the ship into and below the water line of the ship to partially define an air cushion space beneath said ship, and an air cushion seal system comprising at least one inflatable lobe fixed to said ship so as to extend between and have opposite ends cooperating with said inboard sides to assist in sealing said air cushion space;

said inflatable lobe being primarily formed of sheets of flexible air passage-impervious material including upper and lower diaphragm portions, wherein said lower diaphragm portion has its aft end rolled upwardly and forwardly for attachment to said upper diaphragm portion;

partial closure sheets formed of flexible and substantially air passage-impervious material having marginal edges right-angle folded and attached to said opposite ends of said lobe only around said lower diaphragm portion while being free from said upper diaphragm portion so as to partially close said opposite ends of said lobe against water ingress while providing a degree of configuration stabilization to said opposite ends of said lobe against operationally encountered buffeting forces; and said closure sheets are inset relative to said opposite ends of said lobe so as to avoid frictional contacts thereof with said inboard sides.

5. The combination as set forth in claim 4 wherein said closure sheets have their right-angle folded marginal edges bent outwardly and affixed thereat to said lower diaphragm portion.

6. The combination as set forth in claim 4 wherein said closure sheets have their right-angle folded marginal edges bent inwardly and affixed thereat to said lower diaphragm portion.

* * * * *